United States Patent [19]

Chimenti et al.

[11] Patent Number: 4,622,118
[45] Date of Patent: Nov. 11, 1986

[54] METHOD AND APPARATUS FOR SEPARATING WAX/WATER FROM HYDROCARBON OIL MIXTURE BOILING IN THE LUBRICATING OIL RANGE

[75] Inventors: Robert J. L. Chimenti, Short Hills; Anthony E. Cerkanowicz, Livingston; Douglas G. Ryan, Rockaway, all of N.J.

[73] Assignee: Exxon Research and Engineering Company, Florham Park, N.J.

[21] Appl. No.: 722,162

[22] Filed: Apr. 11, 1985

[51] Int. Cl.⁴ .............................................. B03C 5/00
[52] U.S. Cl. .................................. 204/188; 204/302; 204/308; 210/748
[58] Field of Search ............... 204/186, 188, 302, 308; 210/748

[56] References Cited

U.S. PATENT DOCUMENTS

| | | | |
|---|---|---|---|
| 2,054,273 | 9/1936 | Subkow | 204/300 |
| 2,060,839 | 11/1936 | Waterman | 204/188 |
| 2,061,197 | 11/1936 | Kiech | 204/188 |
| 2,440,504 | 4/1948 | Fisher et al. | 204/300 |
| 3,129,157 | 4/1964 | Lockenhoff | 204/180 |
| 3,412,002 | 11/1968 | Hubby | 204/188 |
| 3,489,669 | 1/1970 | Ruhnke | 204/186 |
| 3,567,619 | 3/1971 | Brown | 204/188 |
| 3,616,460 | 10/1971 | Watson et al. | 204/188 |
| 3,799,872 | 3/1974 | Hargis et al. | 210/21 |
| 3,928,158 | 12/1975 | Fritsche et al. | 204/188 |
| 4,139,441 | 2/1979 | Bose | 204/191 |
| 4,193,774 | 3/1980 | Pilat | 55/10 |
| 4,194,956 | 3/1980 | Seguine | 204/186 |
| 4,200,509 | 4/1980 | Seguine | 204/186 |
| 4,334,987 | 6/1982 | Mamadzhanov et al. | 209/210 |
| 4,435,261 | 3/1984 | Mintz et al. | 204/168 |

Primary Examiner—Howard S. Williams

[57] ABSTRACT

In order to separate wax particles and/or water droplets from lubricating oil, free excess electric charge which is net positive or net negative is introduced into the wax/water-laden oil, preferably by charge injection. Wax particle/water droplet agglomeration and particle/droplet size growth within the oil mixture due to the electrophoretic effect arising from the electric charge introduction is allowed to occur. In this way, wax particles or water droplets normally considered to be of insufficient size to be separated effectively by filtration can be removed by filtration if the lube oil is electrically pretreated as described. The filtration, conveniently, can be effected by passing the oil mixture containing the grown wax particles/water droplets through a bed of collector beads of low electrical conductivity or through a settler or, in the case of the wax, through a filter screen.

26 Claims, 4 Drawing Figures

METHOD AND APPARATUS FOR SEPARATING WAX/WATER FROM HYDROCARBON OIL MIXTURE BOILING IN THE LUBRICATING OIL RANGE

CROSS-REFERENCE TO RELATED APPLICATIONS

The specification of this application refers to other applications of the present assignees filed on the same day as the present application and bearing the undermentioned assignee case references:
Ser. No. 722,107
Ser. No. 722,162
Ser. No. 722,163

BACKGROUND OF THE INVENTION

This invention relates to methods and apparatus for separating dissolved wax and wax particles and/or water droplets from a hydrocarbon oil mixture boiling in the lubricating oil range, in which mixture the wax/water forms a dispersion. The term "wax particles" herein means wax in any particulate form and includes wax crystals. Furthermore, throughout this specification, it is to be understood that "hydrocarbon oil mixture" and "oil mixture" both mean a hydrocarbon oil mixture boiling the lubricating oil range.

The problems of wax or water in lubricating oil are very well known in the art. In the distillation of crude oil, a proportion of wax is present in cuts taken in the lubricating oil range. Some of the wax remains dissolved in the oil whereas other fractions form a haze as the oil fraction ages at ambient temperatures or below. Wax in itself is in fact a good lubricant but under comparatively low temperatures such as engine cold start conditions, its presence causes the oil to be thick and viscous and as a result the engine may be hard to turn over at sufficient speed during starting. In the case of water droplets, which include both very tiny water droplets (e.g. less than about 1 mm in diameter and exemplified by approximately 1 to 100 micron diameter droplets) and water molecules suspended in the lubricating oil, they detrimentally affect the lubricating properties of the oil and increase engine wear and corrosion. Haze manifests itself as a milky or cloudy appearance in the oil and is usually caused by either water or wax or both water and wax being present in the lubricating oil. Typically a minimum of about 50 ppm. of water or a minimum of about 0.1% by volume of wax will cause some lubricating oils to look hazy. Therefore the existence of haze caused by the presence of water droplets or wax crystals or particles all detrimentally affect the performance of lubricating oils. It is of paramount practical importance to devise techniques for removing wax and/or water haze from lubricating oil in a relatively inexpensive, simple and effective manner, which techniques are also capable of implementation on an industrial scale.

DESCRIPTION OF THE PRIOR ART

Techniques have been available for many years which enable dispersed particles or dispersed droplets in a continuous background phase to be removed from that continuous phase. Some techniques have been specially devised for separating wax and water from oil. One broad category of separators is electrofilters. In many known electrofilters, the electrofiltration process results in agglomeration or coalescence of the dispersed particles or droplets to form larger agglomerates or droplets which can then be more readily separated from the continuous phase.

For example, in U.S. Pat. No. 2,108,258 (Fisher), agglomeration of water from a water-in-oil emulsion takes place due to the action of a high field gradient existing near a pointed electrode which is immersed in the emulsion. The field induces fluid motion which transports the water particles to a distinct water layer on which the emulsion is floating.

U.S. Pat. No. 1,940,654 (Stanton) discloses a petroleum dewaxing technique based on electrophoresis. Two possible mechanisms are described in which the technique imparts charge to the wax crystals, i.e. direct contact charging and charging by passing the crystals through a glow or brush discharge (comprising bipolar gas-phase ions). Stanton recognises that a high voltage alternating electrostatic field has a coalescing or agglomerating effect upon solid wax particles suspended in petroleum oil.

In U.S. Pat. No. 1,838,929 (Fisher) a method, which appears to operate on the principle of dielectrophoresis, is described to cause water passed between two electrodes to agglomerate the water droplets sufficiently that the water and oil phases readily separate when the elecrically-treated emulsion is passed into a separator. Flanges on a central electrode cause a high field gradient to exist at their edges and they are claimed to accelerate the treating action. The central electrode is conically-shaped to produce a more rapid fluid flow in the lower extremity of the treating apparatus.

U.S. Pat. No. 4,341,617 (King) uses sharply pointed projections on one electrode of a pair of oppositely charged electrodes associated with a treating chamber in an electrostatic treater for waste liquid to be discharged into municipal sewage systems, to concentrate the electric field at the projection tips for encouraging flocculation of impurity particles carried by the waste liquid. In another arrangement, the projection tips inject change carriers into the waste liquid and a resulting electrical current flow is established through the waste liquid between the two electrodes. The net positive charge due to the flow of positive ions in one direction exactly equals the net negative charge due to the flow of negative ions in the opposite direction. King does not mention any application to separating wax or water from lube oil.

Each of U.S. Pat. Nos. 2,039,636 (Dillon et al); 2,053,552 (Dillon et al); 2,067,162 (Fisher et al); 2,151,318 (Dillon et al); and 2,174,938 (Dillon et al) is concerned with electrofiltration of wax-bearing oil using an electrical treater in which an electric field is applied between two electrodes. As a result some wax is deposited on the electrodes while the remaining wax is agglomerated. The thus treated wax precipitate is in a form which can be much more readily settled or otherwise separated, such as by filtration or centrifuging.

Reference is also directed to U.S. Pat. No. 3,324,026 (Waterman et al) which discloses an electric filter for removing suspended contaminants from substantially water-free, high resistivity, oils. The contaminated oil is flowed through the poles of individual elements of porous material forming a multi-element mass filling a treating space between two electrodes which maintain a high-gradient unidirectional electric field in the treating space. Before the oil is passed through the multi-element mass, it may be subjected to electrical discharge or blast action by a plurality of relatively sharp pointed pins of one polarity facing but spaced from a member of opposite polarity. However, the Waterman patent does not specifically address agglomeration of the suspended contaminantes to form larger agglomerates which can then be more readily separated from the oil.

It is remarked that known separation techniques such as described above can operate quite satisfactorily in practice, but have the disadvantage that they are not particularly effective in the case of wax, water or other contaminant particle or droplet sizes below a certain level (especially of the order of submicron-size or micro-size diameter—for example about 0.1 to 100 microns). This may be due to the fact that the electrostatic force acting on each individual particle due the applied electric field becomes insufficient, when the particle or droplet size becomes sufficiently small, having regard to the viscous drag forces exerted by the oil or continuous background phase and the maximum possible charge level on the individual particles or droplets.

It is also known from U.S. Pat. No. 4,255,777 (Kelly), assigned to the present assignees, to inject net unipolar charge into a liquid predominantly or solely by field emission. This patent specifically discloses an electrostatic atomizing device and process for the formation of electrostatically charged droplets having an average diameter of less than about 1 millimeter for a liquid having a low electrical conductivity. Envisaged applications of the electrostatic atomizing technique are for spraying cleaning fluid onto the surface of an article to be cleaned, for spraying agricultural liquid, such as an insecticide, onto vegetation or soil, for spraying lubricant onto bearings and gears of large industrial machinery, for surface coating an article by spraying a solution of a plastic dissolved in a non-conductive liquid or an oil-based paint, to inject free excess charge into a molten plastic, glass or ceramic, and for spraying liquified plastic material for forming surface coatings. Another possible application is to produce charged droplets of liquid e.g. paint within a body of the same liquid which is in contact with a metal surface, so that the charged droplets deposit as a coating on the metal surface. Charged droplets of for example perfume could be sprayed onto oppositely charged power e.g. talcum powder. Yet another application is the atomization of hydrocarbon fuels, for increasing combustion efficiency. However, the Kelly patent neither discloses nor suggests trying to charge a two-phase liquid comprising dispersed or suspended droplets or particles (such as water or wax) in a continuous liquid phase (such as lubricating oil), nor appreciates that the charge, introduced into the continuous liquid phase, transfers therefrom to the dispersed phase and that an electrophoretic effect occurs which causes migration of the dispersed phase in the liquid phase, nor even suggests any kind of application to electrical separation.

Finally, reference is directed to U.S. Pat. No. 4,435,261 (Mintz et al), assigned to the present assignees, which discloses a technique for the free radical polymerization of liquid monomers into thermoplastic polymers. Free excess charge is injected into the liquid monomer, so as to initiate polymerization of the monomers into a polymer.

SUMMARY OF THE INVENTION

The invention is concerned with removing wax particles and/or water droplets from a hydrocarbon oil mixture, e.g. lube oil, boiling in the lubricating oil range.

The inventors have discovered that by introducing free excess electric charge which is net unipolar into the oil mixture, charge becomes attached to the wax particles and water droplets and at the same time an electric field is induced in the oil mixture. Free charge introduced into the wax/water-containing oil mixture is positive or negative ions which, initially, are free to move through the continuous oil mixture phase. The continuous phase acts as a medium through which volumetric distribution of introduced change occurs, so as to establish the induced electric field in the mixture. The charge on the wax particles and water droplets interacts with the induced electric field and under the resulting electrophoretic effect, wax particle and water droplet migration within the continuous oil mixture phase takes place. Colliding wax particles and colliding water droplets tend to agglomerate and coalesce, thereby forming larger wax particles and water droplets. This process continues, resulting in continued particle and droplet growth.

This particle/droplet growth mechanism can be harnessed in various ways to secure the separation of the wax and water from the lube oil. One way is simply to allow the agglomeration and coalescence to continue until the wax particles settle under gravity to form a mass of wax in the oil mixture or until gravity causes the grown water droplets to settle and coalesce with other settled droplets to form a water layer on which the oil mixture floats. Another approach is to employ the particle/droplet growth mechanism as a pretreatment, and then to employ a filtration process to separate the grown wax particles or water droplets from the oil mixture. One particularly advantageous result is that filtration, centrifugation, or settling processes, which on their own would be ineffective to separate very small wax particles or water droplets (e.g., less than 1 micron in diameter) from lube oil because they are on average too small to be separated, can be made effective when preceded by the electrical pretreatment which grows the wax particles and/or water droplets to a large enough size. Phase separation processes which are both technically simple and cheap to implement can be used. For example, grown wax particles can be separated by passing the wax-containing oil mixture through a filter medium such as a relatively coarse filter cloth or filter screen. Alternatively, for separating both dispersed wax and water droplets, the oil mixture can be passed through a bed of densely packed beads of low electrical conductivity. Wax particles are deposited on the beads which can be renewed, cleaned or regenerated periodically. Similarly, grown water droplets will collect and coalesce on the bead surfaces to form larger droplets which eventually separate from the beads under gravity and settle to form a water layer below the oil mixture. These various ways of putting the present invention into effect will be described in more detail below.

It is remarked that the region or zone where the agglomeration or coalescence occurs should be devoid of any internal surface areas which, if present, would tend to intercept the electrophoretically migrating wax particles/water droplets before they would have the opportunity to collide with other wax particles/water droplets. Such surface areas would act to cause wax particles to deposit on them or water droplets to coalesce in contact with them. This alternative approach to collecting and separating the wax/water from the oil mixture is the basis of copending U.S. patent application Ser. No. 722,163 filed on the same day as the present case and assigned to the present assignees. Reference is hereby directed to that application for an explanation of how wax particles and water droplets can be electrically separated from lube oil using internal surface areas intercepting the migrating wax particles/water droplets. It is also remarked that the charged oil mixture should be allowed sufficient time to enable adequate wax particle/water droplet growth to occur. This can be achieved by introducing wax-bearing oil mixture into a separation vessel and discharging oil mixture out of the separation vessel while arranging that the residence time of the charged oil mixture in the separation vessel will enable the required wax particle/water droplet growth to occur.

The basis for the effective separation that can be achieved when putting this invention into effect is believed to be as follows. The first step in the separation process in the production of an excess (i.e. net unipolar—positive or negative) charge density in the otherwise electrically-neutral wax/water-laden lube oil mixture. Several techniques are available to produce a transient or steady-excess charge density. Broadly speaking, such methods fall into two general categories, namely: (1) injection of excess charge across the interface or boundary which confines the lube oil mixture, and (2) volumetric charge introduction techniques into the bulk of the lube oil mixture. Examples of the first category include electron beam and high energy particle irradiation, photo-emission and charge transport by a moving fluid. Reference is hereby directed to the aforesaid U.S. Pat. No. 4,255,777 in the name Arnold J. Kelly, assigned to the present assignees, the contents of which are expressly incorporated herein, for a description of one example of how charge injection can be achieved predominantly or solely by field emission. Field emission, electron beam irradiation and photo-emission are all examples of electron emission. Examples of the second category are photoionization of either or both of the wax/water and the oil mixture and secondary ionization by thermalization of high energy particle irradiation of the wax/water-bearing oil mixture. These examples all involve ionic dissociation within the oil mixture.

It is necessary that there be an excess of free charge in the oil mixture in the sense of a sufficient abundance that an effective migration of wax/water will occur. Typically, the density of the free charge would be of the order of $10^{16}$ charges per m$^3$. A lower limit would be about $1 \times 10^{10}$ charges per m$^3$. A typical preferred range of free charge density is about $1 \times 10^{13}$ to $1 \times 10^{19}$ charges per m$^3$ or even higher, for providing effective migration of the wax/water.

The charge introduced into any stream to be decontaminated must be net negative or net positive. However, providing this requirement is met, then it is equally possible to introduce the excess charge using two streams of the same wax/water-bearing lube oil of opposite but unequal levels of charge or alternating net positve and net negative streams.

The second step in the process is the transference of the major portion of the excess charge to the wax/water in the lube oil. In a preferred way of performing the invention in which a charge injector, such as disclosed in the aforesaid U.S. Pat. No. 4,255,777, is used for introducing net unipolar free excess charge into a wax/water-laden stream of lube oil, the stream issues from the charge injector as a continuous stream or spray through a gas or vapor space and enters a separation vessel where a body of charged oily liquid is collected. The gas or vapor space is provided to enable the charged lube oil to exit the charge injector with high velocity to efficiently sweep out the injected charge and also to eliminate any charge dissipation path back to the charge injector. Such decoupling of the separation vessel from the charge injector is important for achieving a high level and high efficiency of charge injection. It is of no particular importance to the effective separation of the wax/water from the lube oil whether the dispersion-laden stream is sprayed by the charge injector or simply issues as a continuous stream into the separation vessel, particularly at relatively high velocity throughputs in the carge injector. However, when the liquid is sprayed, the individual lube oil droplets are in general separated from one another and this can be important where lower throughput velocities, closer to the drift velocity of the individual charges, are employed. It is however remarked that there should be no contact between the spray or stream passing through the gas or vapor space and the surrounding separation vessel wall, in order to avoid charge dissipation. The gas or vapor space can be provided by the ambient atmosphere separating the charge injector from the separation vessel, but it may be preferred for it to be enclosed and a purge gas, e.g. nitrogen, circulated through the space to avoid any risk of explosion or chemical reaction. In addition, the purge gas helps to obtain uniform separation results irrespective of changes in ambient conditions, especially humidity, which can affect the rate of depletion of charge where an air space is present. In the absence of any such gap, reduced separation efficiencies will result. According to a development, the gas or vapor space is pressurised for maintaining a higher throughput rate in the separation vessel.

In the separation region, it is assumed that the excess charge density greatly exceeds the liquid background charge density (i.e. the density of bipolar charge carriers which are intrinsic to the lube oil and which result in the conductivity of the lube oil); then, the induced electric field in the separation region caused by the excess charge density will act on the individual charge carriers and drive them to the boundaries of the lube oil. Some of the charge will be intercepted by the individual wax particles/water droplets and these particles/droplets will thereby become charged.

The next part in the process involves the interaction of the migrating wax particles/water droplets in the bulk of the lube oil mixture. In this invention, the wax/water contaminant is assumed to be present in the lube oil mixture at number densities so as to result in the mean inter-particle or inter-droplet separation being less than, and preferably significantly less than (e.g. 1% or less), the smallest of the internal dimensions of the separation vessel (e.g. its diameter, in the case of an upright cylindrical separation vessel). Agglomeration or coalescence of the particles/droplets will occur to form large particles or droplets as the case may be. The basis for this mechanism is believed to be as follows.

The wax particles or water droplets in general have a wide distribution of diameters and charge levels. In some cases many of the particles/droplets will be uncharged. Consequently, any individual charged particle/droplet will move in response to the macroscopic electric field produced by the distribution of free charge in the lube oil mixture with a non-zero relative velocity with respect to most of the other particles/droplets. Thus, a moving charged particle/droplet may be expected to undergo collisions with both charged and uncharged particles/droplets during its transit towards the boundary of the oil mixture, providing the distance to the boundary sufficiently exceeds the distance to the next nearest particle/droplet and even though the charges on the particles/droplets are of the same polarity. The collision cross-section for the case of a charged and uncharged particle/droplet is higher than the collision cross-section for two uncharged particles/droplets since the charged particle/droplet induces a dipole moment in the uncharged particle/droplet as the distance between them diminishes during the interval leading up to the collision. Thus, attractive force exists and becomes stronger as the two particles/droplets approach each other. The collision rate for a charged particle/droplet in a background of uncharged particles/droplets is the product of collision cross-section and the relative velocity.

In the case that a charged particle/droplet moves towards a second charged particle/droplet charged to the same polarity, and for purpose of explanation the second charge is of lower magnitude than the first charge and the particle/droplet sizes are equal and the electric fields that both charged particles/droplets experience is the same, then the forces on the two similarly charged particles/droplets will result in coalescence if the product of the electric field and the square of the sum of the particle/droplet radii exceeds the product of the two charges divided by the difference between the magnitudes of those two charges.

In both cases, upon collision that charge may be shared by both collision partners. If the resulting electrostatic repulsion between the similarly charged, contacting particles or droplets and the shear forces which are exerted upon them are less than the surface adhesion forces, the conglomerate will be stable and charged. If two charged water droplets collide, as in a water-in-oil emulsion, coalescence into a single larger charged drop may occur. Similarly, two colliding wax particles will usually unite to form a wax agglomerate of larger size. The agglomeration and coalescence may continue until each particle/droplet either reaches the boundary of the oil mixture or increases in size, through agglomeration and coalescence with other particles/droplets, until it become separated from the bulk of the oil mixture by conventional methods such as centrifugation, settling, or mechanical filtering. For dispersed water droplets, this will conveniently entail settling of the re-entrained water to form a distinct continuous water phase. Where the wax particles are present, migrating wax particles can form into agglomerates due to Van de Waals's physical cohesive force, quite apart from any other adhesive forces acting to unite the colliding wax particles, and a precipitate of wax conglomerates will build-up on the bottom of the separation vessle. There may be a more limited deposition of wax on the inner lateral wall surfaces of the separation vessel. Periodic cleaning of the fouled surfaces by backflushing, solvent washing, heating or other techniques will remove the deposited wax.

It is to be noted that when using a charge injector to introduce the net unipolar free charge, it is important that the stream velocity through the charge injector is high enough to transport the charged stream away from the electrode region of the charge injector. The stream velocity needs to exceed the drift velocity of the individual charges relative to the oil mixture induced by the electric field produced by the charge injector electrodes. On the other hand, the oil mixture in the separation vessel needs to remain there long enough to enable adequate wax/water agglomeration/coalescence to take place. This generally requires a lower velocity throughput in the separation vessel than in the charge injector. Typical values for the throughput velocities in the charge injector and separation vessel are 1 m/sec and 0.05 to 1 cm/sec, respectively. In another embodiment, the internal cross-sectional diameters of the charge injector outlet orifice and the separation vessel are 0.025 cm and 5 to 10 cm, respectively. These figures are purely exemplary and have no limiting character.

Various techniques are possible for introducing the free charge into the oily mixture. One particularly simple technique is for the free charge to be introduced by charge injection (as mentioned above) directly into the oil mixture to be treated, using a charge injector. However, wax in the lube oil mixture tends to form deposits on any contacting surface areas and there is liable to be a build-up or deposit of wax in the region of the charge injector where charge injection occurs, and this can result in injection efficiency being significantly impaired, and thereby also the overall efficiency of the separation process. To overcome this problem, the free charge may be introduced by charge injection into a stream of substantially dewaxed lube oil which can be a proportion of the dewaxed oil from the separation process itself which is recycled. In this arrangement, both the charged dewaxed lube oil and the uncharged, wax-laden oil are mixed together, suitably in the primary conglomerating region of the separation vessel, so that, in that region, charge transfers to the wax particles and, concomitantly, the self-induced electric field is established. The injection of charge into the wax-free lube oil stream avoids or reduces the possiblity of partial or complete blockage by wax in the charge injector. Another possibility is to use a different liquid altogether as the charge carrier. In that case, some means needs to be provided to separate (such as by distillation, flashing or membrane separation) the carrier fluid for re-use from the clarified lube oil phase.

Where the lube oil is initially at an elevated temperature such that it contains dissolved wax, the oil can be cooled to precipate dissolved wax as wax particles or crystals. Preferably, in addition, an oil solvent is added to the lube oil (hydrocarbon oil mixture boiling in the lubricatng oil range). [Oil solvent] as used throughout this specification refers to those solvents which when added to an oil mixture result in a lower viscosity for the solvent-oil mixture than for the oil mixture alone. This is beneficial for enhancing the settling, filtration or other wax separation processes used to separate the charged precipitated wax particles from the solvent-oil mixture. Usually, the oil solvent will have the additional property of having a higher solubility for the oil mixture than for the wax at any given temperature, so that during drilling of the solvent-oil mixture to precipitate wax, the wax precipitation is enchanced. An oil solvent can be used as a carrier liquid for the injected charge, the charged oil solvent carrier liquid being added to the uncharged oil mixture. Preferably, the oil solvent, wax anti-solvent is an alkane or alkene whose molecular weight is between 16 and 114, or any other oil solvent, wax anti-solvent whose electrical conductivity is less than about $10^{-8}$ (ohm. m)$^{-1}$.

It is stressed that the electric field is not an applied field resulting from the application of voltage between a pair of electrodes, but rather arises from the total introduced or injected charge distribution in the lube oil mixture in the separation vessel and on the wax/water and any separation vessel wall surface regions or internal collector surfaces where wax/water separation occurs.

Taking the concept of the present invention to its limit, it will be appreciated that providing the primary conglomerating region within the separation vessel is made large enough and that sufficient charge is injected with regard to the density of the wax/water disperses phase and the viscosity and conductivity of the lube oil, all or substantially all of the wax/water will come out of suspension and separate out without any contact with the wall surfaces bounding the primary conglomerating region.

According to another aspect of the invention, the wax/water-laden lube oil mixture may be subjected to the electrical treatment described above, using a separation vessel whose interior is devoid of any internal wax/water collector surfaces or beads. In the separation vessel, therefore, wax particles and/or water droplets will agglomerate and coalesce to form larger agglomerations of wax and larger water droplets. The residence time of the charged lube oil in the separation vessel, the injected charge level, and the internal dimensions of the separation vessel, are all selected such as to produce the required degree of wax particle/water droplet growth in the separation vessel. Following this electrical pretreatment in the separation vessel, lube oil from the separation vessel, containing grown wax particle agglomerates and/or grown water droplets, is then passed through a filtration apparatus which can for example be a gravity settler or, in the case of wax, a filter screen. It will be appreciated therefore that the extent of particle/droplet growth required in the separation vessel must be sufficient according to the filtration capability of the filtration apparatus.

In accordance with a preferred way of performing the method of this invention and in accordance ith a preferred embodiment, the wax agglomerations/coalesced water droplets, settling in the primary conglomerating region of the separation vessel under gravity, sink to a secondary conglomerating region, located below the primary conglomerating region. This secondary region comprises a multiplicity of exposed collector surfaces within the phase mixture, so that further coalescence of the contaminant droplets will occur on those exposed collector surfaces. In other words, a certan degree of particle/droplet size growth is achieved in the primary conglomerating region and this growth is continued further in the secondary conglomerating region while in contact with the exposed collector surfaces, whereby fully grown water droplets developed in the secondary conglomerating region can settle out readily under gravity to form a distinct layer of water in the bottom of the separation vessel and wax deposits form on the collector surfaces. Suitably, the collector surfaces in the secondary conglomerating region are provided by a bed of closely packed beads of a material which has low conductivity and may be non-porous or porous.

It is to be noted that the collector surfaces need not necessarily be stationary. For example, the lube oil in which conglomeration of wax/water has occurred in the primary conglomerating section could be seeded with collector beads before entering the secondary conglomeration section of the separation vessel and the beads removed from the oil mixture again at a downstream location. For this purpose, the secondary conglomeration region could be provided with a bead inlet near the top and a bead outlet at the bottom. Alternatively, the bed of beads comprising the secondary conglomeration section can be fluidised. One way in which this can be achieved is using a concentric cylinder arrangement for the separation vessel with the beads at least partially filling the annular gap between the two cylinders and pressurising the gas space above the lube oil in the separation vessel to drive the charged lube oil inside the inner cylinder into the annular space from below.

The primary conglomerating region may be designed so that all of the excess charge is contained within this region and there is no excess charge in the secondary region. Hence, the configuration of the collector surfaces and their material of construction may be chosen so as to optimise separation of the water droplets/wax particles. Means for accomplishing this are well known to those skilled in the art.

In accordance with a preferred feature of the invention, the separation vessel is provided with means responsive to the level of lube oil mixture in the primary conglomerating region for regulating the rate of supply of lube oil mixture to be treated, so as to maintain the level substantially constant. In this way, the volume of charged lube oil in the primary conglomerating region is maintained substantially constant, so that the required degree of initial growth of droplet/article size can occur within the primary conglomerating region.

With the present invention, it is possible to provide an apparatus and method for the effective separation of wax or water from lube oil, especially where the mean wax particle/water droplet size is very small (e.g. of the order of 0.1 micron to 1 mm in diameter).

The wax/water separation apparatus can be made to be simple in construcion and reliable in operation, whilst a separation method can be provided which is simple to put into effect. With the invention, it is possible to attain a high level of clarity for the treated lube oil.

It will be appreciated that the invention is not limited to separating either wax or water from the lube oil mixture. They can usually both be removed from the lube oil at the same time. Furthermore, the invention is not selective for removing only wax and water from lubricating oil, but wll also be effective for separating other contaminant particles such as grit, catalyst fines, asphaltene particles, oxide scale, corrosion scale and other corrosion products, coke fines and the like which may also be present with the wax either singularly or in some combination.

BRIEF DESCRIPTION OF THE DRAWINGS

The foregoing and other advantages and benefits of the invention will become apparent from the following description given, by way of example, with reference to the accompanying drawings, in which.

DESCRIPTION OF THE PREFERRED EMBODIMENTS

Figure 1:
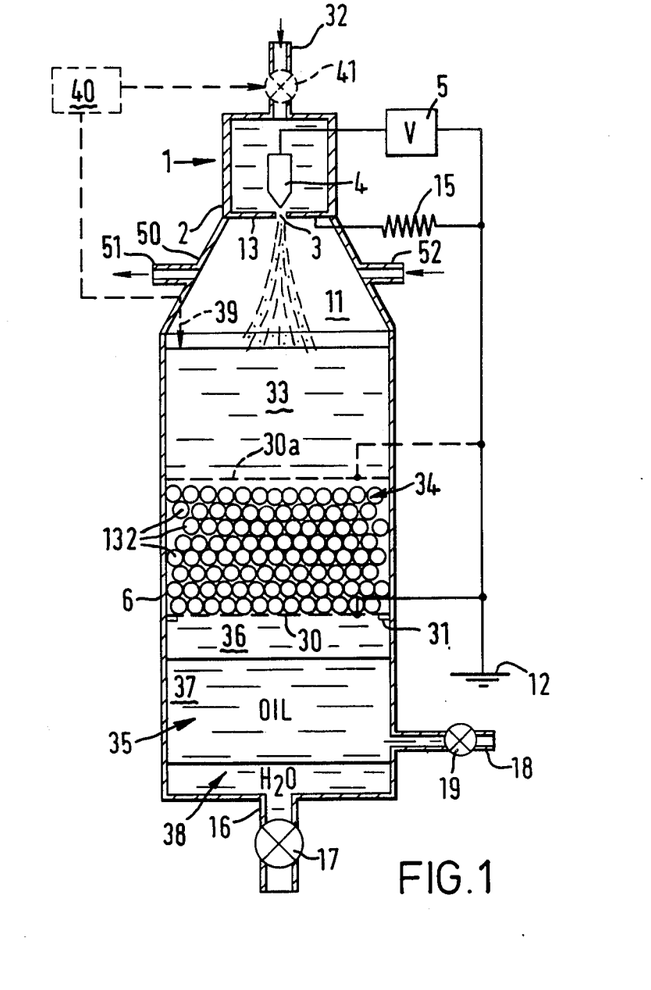
FIG. 1 shows, diagrammatically, a vertical section through one form of separation apparatus in accordance with the invention, adapted for breaking of a water-in-lube oil emulsion, and for removing wax.

FIG. 1 shows a vertical sectional view through one form of electrofilter in accordance with the invention which is capable of separating wax particles/crystals and fine water droplets suspended in a lubricatng oil. Initially, for convenience, the removal of water droplets from the oil will be described. This description will be followed by an explanation of how the electrofilter separates wax particles and crystals from the lubricating oil.

In FIG. 1, water-in-oil emulsion is introduced through line 32 into the inlet of a charge injector 1 which injects free charge which is net positive or net negative into the oil/water mixture. However, it is to be understood that, alternatively, two streams of a positive charge or alternating net positive and net negative streams may be used instead, providing the net charge introduced is net positive or net negative.

Suitably, the charge injector 1 is constructed in accordance with the teaching of the aforesaid Kelly U.S. Pat. No. 4,255,777 to which reference is directed for a more complete disclosure of the construction and operation of the charge injector. However, in substance, such a charge injector as shown, essentially comprises an upright, suitably cylindrical, chamber 2 through which the mixture passes, having a bottom wall 13, including a central orifice or opening 3 and a sharply pointed electrode 4, mounted inside chamber 2 and connected to the high potential terminal of voltage power supply 5 whose earth terminal is grounded at 12, the tip of the electrode 4 being located closely above, and in axial alignment with, the opening 3. The chamber bottom wall 13 serves as a second electrode which is maintained at a lower voltage, relative to earth, than pointed elctrode 4, by means of a connection to earth 12. This connection may be made through a resistance element 15. Charge is injected by the pointed electrode 4 into the water-in-oil emulsion issuing through the opening 3 and the charged emulsion issues or sprays, through a gas or vapor space 11, into an upright vessel or reservoir 6 located below the charge injector 1. As shown gas or vapor space 11 is enclosed by a frustoconical shaped cap 50 of the separation vessel, on which the charge injector body is mounted, and the space 11 is open to the atmosphere through pipe 51. Alternatively, in order to avoid risk or explosion or chemical reaction, the separation vessel may be sealed and a purge gas may be circulated through the vapor space using inlet and outlet pipes 52, 51. In another arrangement, gas space 11 is pressurized from an external source (not shown). A horizontally arranged metallic gauze 30 located within vessel 6 approximately half-way up its height on an internal supporting shoulder 31 is also connected to earth 12 and completes the electrical circuit of the charge injector. A bed of densely packed collector beads 132, for example glass beads, rests on the gauze 30 and occupies approximately half of the volume within vessel 6 above the gauze. An alternative location for the gauze electrode is when it covers the collector beads 132, as shown at 30a in FIG. 1. In this arrangement, other means for supporting the bed of collector beads 132 would need to be provided.

The separation vessel interior comprises, working from the top downards, an uppermost section 33 which is free of any collector surfaces apart from the internal wal regions of vessel 6 and which constitutes a primary conglomerating region, the section 34 which is occupied by the beads 132 and which serves as a secondary conglomerating region, and separation region 35 in which the emulsion breaks up into a water-in-oil layer 36, an oil layer 37 and a water layer 38, as will be described in more detail below. The smallest dimension of the uppermost section 33 should preferably be at least 100 times greater than the initial average distance between individual water droplets, but this requirement is not essential. The beads suitably are glass beads, but they may instead be made of other materials of low conductivity, e.g. plastics or ceramics generally. The beads need to have low conductivity in all arrangements, such as provided by gauze 30 in FIG. 1, in which a low conductivity path exists from the beads to earth, in order that they do not conduct away the electrical charges in the separation vessel 6 too quickly, as otherwise inadequate or ineffective electrical separation will result.

It is to be noted that if there were no primary coalescing region provided by section 33 devoid of any beads, separation of the contaminant might not in every case (e.g. water-in-oil emulsions) be wholly effective with very small droplets, but this drawback is overcome in the present embodiment because the primary coalescing region 33 grows the water droplets to a sufficient size that effective separation can occur in the bead separation region 34.

The stream issuing downwardly through opening 3 may break into a spray at a short distance below the opening in air gap 11, depending on the charging potential of the charge injector, but the existence of a spray is not critical to the effective operation of the separation apparatus. The separation vessel 6 is provided in the bottom thereof with an outlet pipe 16, including a valve 17, for discharging separated water from the separation vessel. Similarly, the vessel 6 has in its side wall an outlet pipe 18, including a valve 19, located above the oil/wter interface, for releasing clarified lube oil from vessel 6.

It is to be noted that because of the very large cross-sectional area of the interior of vessel 6 as compared with that of the stream of charged phase mixture emerging through outlet 3, the stream velocity through the charge injector 1 is relatively high, so as to ensure an adequate level of charge injection, whereas the downward velocity of the body of liquid in vessel 6 is very small or, expressed another way, the residence time in the separation vessel is comparatively long. The residence time has to be sufficiently long that the injected electric charge has enough time to act to cause the water to be separated from the lube oil. Typical dimensions for the internal cross-sectional diameter of the separation vessel and the spray outlet diameter are 10 cms and 0.005 cms respectively.

In operation, with valves 17 and 19 set to determine flow rates for clarified water and oil which match the flow rate through charge injector 1, or by selective periodic opening and closing valves 17, 19 so as to maintain the body of liquid in vessel 6 at an approximately constant level close to the top of the separation vessel, excess charge carriers are induced to be emitted from the sharply pointed end of electrode 4 when this electrode is maintained at a sufficiently high negative potential with respect to spray opening 3. The charge carriers are then swept from the pointed electrode 4 by the cross flow of the water-in-oil emulsion to be clarified issuing through the orifice 3 and conveyed into the separation vessel by the emulsion stream or spray issuing from the charge injector 1. Within upper region 33, the major portion of the injected charge has transferred to the water droplets, so as to drive the droplets towards the bounding wall surfaces of separation vessel 6. Ideally, the internal dimensions of separation vessel in region 33 are chosen to be much larger (typically 100 times or more) than the mean inter-droplet spacing within the continuous oil phase. In this way coalescence of the migrating water droplets will occur for most of the water droplets within region 33 before the droplets reach the internal wall surfaces of the separation vessel, and larger water droplets are thus formed. Other droplets will reach the inner wall surfaces of the separation vessel and coalesce there, to form larger droplets which break away from the wall surfaces, or a surface water film may be formed on the separation vessel wall to promote settling of the water contaminant. The larger droplets as formed in both ways start to settle, due to the effects of gravity and downward flow within separation vessel 6, the downward settling being superimposed on the droplet migration on the generally radial direction, and the settling droplets accordingly encounter the collector beads 132 in section 34, on whose exposed surfaces the droplets coalesce further until they are large and become detached from the bead surfaces and separate out by gravity settling to form the bottom, water layer 38. It will be appreciated that the close packing of the beads provides very short migration paths for the droplets in the secondary conglomerating region, to enhance water separation. The oil from which the water droplets have been removed tends to separate out into oil layer 37 floating on top of water layer 38, water-in-oil emulsion occupying the remainder of the volume taken up by the body of liquid in vessel 6 and which fills section 33 the interstices between the beads, and water/oil layer 36. Where valves 17, 19 are set to define predetermined flow discharge rates for the clarified water and oil phases, an optional level control arrangement can be used to keep the level of charged water-in-oil emulsion in section 33 substantially constant, this arrangement comprising a controller 40 which responds to the level detected by a level sensor, diagrammatically designated at 39, and controls the opening of a regulator 41 in the input line 32 to the charge injector 1 so as to reduce any error between the output from level sensor 39 and an input signal representing the desired level.

When the lubricating oil contains wax particles or crystals instead of water haze or droplets, the separation mechanism is essentially the same except that the wax deposits on the bead surfaces and within the interstitial spaces between the collector beads in the central region 34 of the separation vessel, instead of collecting at the bottom of the separation vessel. Therefore, in the primary conglomerating region 33, just as for the water droplets, wax particles which have acquired an electrical charge due to the charge injection start to migrate within the lube oil phase as a result of the electrophoretic interaction between the charged wax particles and the self-induced electric field acting within the oily mixture in the primary conglomerating region 33. Due to the electrophoretic migration, wax particles collide with one another and unite to form wax particle agglomerations. In this way, wax particle or crystal growth occurs in the primary conglomerating region 33 and, with time, these grown wax particles encounter the separation beads 132 in the central region 34 where the particles form deposits and accumulate. Lube oil which has passed through the central region 34 and into the lower region 35 is accordingly relatively wax-free and can be discharged periodically or continuously as required.

In order to effect the separation of dissolved wax in the lube oil, firstly, an oil solvent liquid can be mixed with the wax-laden oil to be treated electrically, for example by adding a stream of such oil solvent liquid to the stream of waxy oil in line 32, and secondly, the solvent-diluted oil is cooled for example in a flash drum, so as to precipitate dissolved wax before the solvent-diluted oil is introduced into the charge injector. The electrical treatment described above will then be operative for acting on those precipitated wax particles to effect their separation from the lube oil phase, as described hereinabove. An example of such an oil solvent is liquid hexane. Another example is liquid propane which does have an additional benefit over hexane where it is caused to vaporize and in so doing, cools the waxy oil to further encourage precipitation of dissolved wax. In this regard, reference is directed to the present assignees co-pending U.S. patent application, Ser. No. 722,160, filed on the same day as the present application, which encompasses the concept of chilling wax-laden lube oil in combination with the effect of free chage introduction (such as by charge injection) for removal of the wax from the lube oil, and which contains a full description of various ways in which this result can be achieved. In cases where such an oil-solvent liquid additive is used, whether or not for the added reason of chilling the waxy-oil, the liquid additive needs to be recovered from the substantially wax-free lube oil phase, discharged from the electrofiltration apparatus, but techniques for removing the liquid additive are well known in the art and need not be futher described herein.

After significant wax deposits have built-up in the bed of packed beads, the separation effectiveness of the beads will diminish. Therefore, the beads will need periodically to be replaced or cleaned or regenerated as is known in the art.

It will be apparent that the use of a bed of packed beads is not the only way possible for collecting and separating the charge-induced agglomerations of wax. For example, with the gauze in position 30a, there is no further effect on the agglomeration process below the gauze, and the oil below the gauze 30a containing the grown wax agglomerates may be discharged from the separation vessel and the wax separated from the oil/wax mixture by a rotary drum filter settle or any other means for filtration known in the art.

From the foregoing description, it will be appreciated that when the lubricating oil to be electrically treated contains both wax particles and water droplets, the wax particles will be deposited in the bed of packed beads, while water droplets grown on the bead surfaces will separate from the beads and settle under gravity to form the water layer in the bottom of the separation vessel. Therefore, the electrofiltration apparatus is effective for simultanteously dewaxing and dewatering lube oil.

Figure 2:
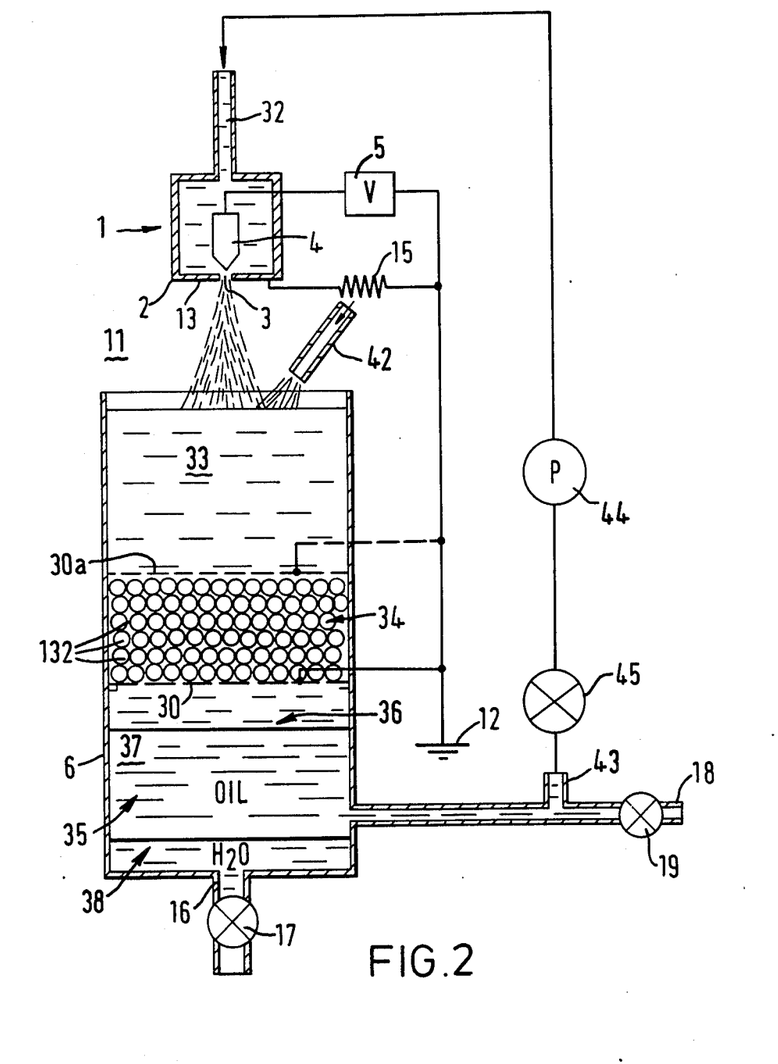
FIGS. 2 and 3 are corresponding views of second and third embodiments.

The electrofiltration apparatus depicted in FIG. 1 will generally operate perfectly satisfactorily for water-in-oil emulsions, but when the lube oil contains wax there is a tendency for wax deposits building-up with time in the region of opening 3, thus unfavourably affecting the charging efficiency of the charge injector and resulting in partial or complete blockage ultimately. The embodiment shown in FIG. 2 is designed to overcome this shortcoming. Here, the wax-containing oil is kept separate from the charge injector and passed along a delivery pipe 42 from which it is discharged through gas or vapor gap 11 into upper section 33 of separation vessel 6. A line 43, including pump 44 and control valve 45, branches out from outlet pipe 18 upstream of valve 19 and leads back, via line 32, to the inlet of charge injector 1. Therefore, the lube oil into which charge is injected is substantially wax-free, and deposition of wax to an extent which would affect the performance of the charge injector is much less likely to occur or can be substantially avoided. The charged, substantially contaminant-free, lube oil issuing from charge injector 1 and the uncharged contaminated liquid discharged from delivery pipe 42 are brought into contact with one another in upper section 33 of the separation vessel and mix there. Charge transfers in this region to the wax contaminant phase. In all other respects, the operation of this modified separation apparatus is the same as in the FIG. 1 embodiment, including the alternative position 30a for the gauze. As before a level control arrangement can optionally be employed. In addition, vapor space 11 can again be enclosed, but the frustoconical shaped cap which is used for this purpose has been omitted in FIG. 2 for simplicity.

Figure 3:
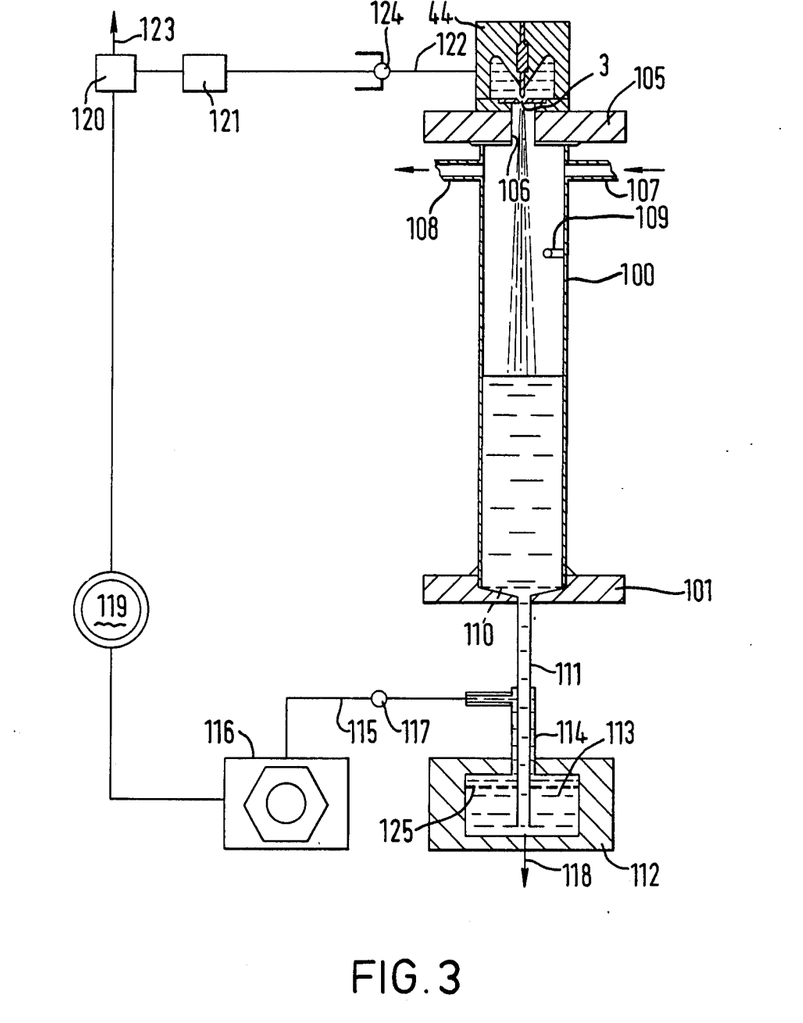

An experimental wax separation apparatus is shown in FIG. 3 which can be used to separate wax from lube oil (with or without added oil solvent). Hexane is one preferred oil solvent and the description which follows relates to hexane-diluted waxy oil. It comprises an open-topped, upright cylindrical separation vessel 100 supported on a base 101. The separation vessel 100 is closed off at the top by a cover 105 which forms an air-tight seal. A charge injector 44, which can be constructed in the same way as the charge injector described above with reference to FIG. 1, is mounted on top of cover 105. A central opening 106 in cover 105 is positioned immediately below the exit orifice 3 of the charge injector so that a downwardly directed stream of charged hexane-diluted waxy oil from the charge injector passes through the opening 106 in cover 105 and impinges onto a body of charged lube oil-hexane mixture in the separation vessel. An earthed grid electrode 110, indicated as a horizontal gauze but which can take the form of other shapes and configurations, is positioned inside the separation vessel close to its bottom, and completes the electrical circuit of the charge injector.

As shown, the separation vessel 100 may also be provided with a gas inlet and outlet, 107 and 108 respectively, for purging the enclosed space above the hexane-diluted lube oil in the separation vessel 100 so that all traces of air are removed. Gas outlet 108 may be connected to an oxygen analyser which monitors for the presence of air or oxygen in the purge gas exhaused from the enclosed atmosphere in separation vessel 100. The gas pressure in this enclosed space can be monitored by a pressure gauge, diagrammatically indicated at 109.

A conduit 111 extends downwardly from the bottom of the separation vessel and conveys charged lube oil-hexane mixture from the separation vessel to a settler 112. The settler comprises a settling chamber 113 including a filter screen 125 (for example a 32 mesh metal screen) extending horizontaly across the chamber. Samples of the mixture in the settling chamber 113 can be taken, using sample line 118. An outlet pipe 114 arranged coaxially around conduit 111, projects upwardly through the top wall of the settler and is connected by line 115 to a turbidity meter 116 which measures the turbidity of the raffinate-hexane mixture passing through it. A preferred form of turbidity meter is one which optically measures the scattering of incident illumination by the oil-hexane mixture from its optical field of view. The temperature of the mixture flowing in line 115 can be monitored by temperature sensor 117 and closely corresponds with the temperature in the separation vessel 100.

A constant volume displacement pump 119 pumps raffinate-hexane mixture from the outlet side of the turbidity meter 116 to a gas separator 120 which separates entrained purge gas from the liquid mixture which then passes through a flow rate detector 121 in line 122 which is connected to the inlet of charge injector 44. Purge gas which has been separated from the liquid stream by the gas separator 120 is piped away along line 123 from recycling or discharge. The temperature and pressure of the lube oil-hexane mixture supplied to the charge injector 44 is monitored by temperature and pressure gauges at sampling point 124 in line 122.

In operation, a quantity of waxy lube oil (containing wax particles and crystals) to be treated for wax removal is introduced into the separation vessel, the lube oil being diluted with hexane. The pump 119 is then started up and the oil-hexane mixture circulates through the separation vessel 100, the settler 112 and back through the charge injector 44. The volumetric flow rate through the apparatus is determined by the pumping action of pump 119. Some of the wax particles suspended in the lube oil are so small (typically in the range 0.1 to 30 microns in diameter) that they cannot ordinarily be removed by passing through a filter medium while at the same time maintaining an adequate throughput on an industrial scale, even with a very fine filter medium. In the absence of charge injection, therefore, the waxy oil will merely circulate around the circuit and none of the wax particles will be restrained by the filter screen 125. However, when charge is injected into the hexane-diluted oily liquid by the charge injector 44 and the charged liquid impinges onto the top of the body of oil-hexane mixture in the separation vessel 100, the electric charge becomes attached to wax particles and crystals suspended in the hexane-diluted oil in the separation vessel and an electrophoretic migration of wax particles is induced which results in wax particle agglomeration and particle size growth in the separation vessel. The grid electrode 110 is believed to contribute to the wax particle growth and agglomeration by providing a conduction path to earth for the charge on charged wax particles and agglomerates contacting the grid electrode. These particles accordingly lose their charge and therefore will agglomerate more readily with migrating charged particles encountering those uncharged particles. Some wax becomes deposited on the inner surface regions of the separation vessel or on the grid electrode 110, but most of the growing and agglomerating wax particles are swept out of the separation vessel 100 by the flow of oil-hexane liquid leaving the separation vessel at the bottom.

In the settler in which the residence time is comparatively long, grown wax particles start to settle under gravity and precipitate to form a mass of wax or a wax cake on the bottom of the settler. Other grown wax particles are drawn upwardly by the flow of hexane-oil mixture leaving the settler at the top, and providing they have grown to a sufficient size to be restrained by the filter screen 125, they are removed from the flow of hexane-oil mixture. Any wax particles which are small enough to pass through the filter screen will be recycled through the charge injector 44 and the whole process is continually repeated so that as time passes the proportion of wax in the oil-hexane mixture from the settler becomes lower and lower. When the wax content is sufficiently low as determined by the turbidity meter 116, the substantially wax-free oil-hexane mixture is discharged from the apparatus, using line 118, and the next batch to be treated is introduced, and so on.

It will of course be recognized that the residence time of the hexane-diluted oil (raffinate) in the separation vessel must be sufficiently long that adequate growth in wax particle size for the wax particles leaving the separation vessel has been achieved such that either the wax particles and agglomerates will separate, by settling, from the raffinate-hexane mixture in the settler 112, or the filter screen 125 can filter the wax particles from the oil-hexane mixture. For a given mesh size for the filter screen and for a separation vessel of given dimensions filled to a particular level, the pump delivery and purge gas pressure will need to be chosen to achieve the desired growth in wax particles size in the separation vessel.

For separating water droplets from oil, a similar arrangement can be used, except that the settler will be specially designed for separating water by gravity settling and there would be no need for a filter screen, except if both wax and water are present at the same time in the oil mixture to be treated.

The foregoing description will now be illustrated by way of two Examples.

EXAMPLE 1

An experiment was run using micron-size water droplets dispersed in a variety of lube base stocks and paraffinic white oils. The experimental apparatus was as shown schematically in FIGS. 1 and 2. In both cases charge was injected and charge transfer and droplet coalescence occurred in the upper or coalescence section of the separation vessel. The water-in-oil emulsion now containing larger water droplets was passed through the bed of packed glass beads. As the charged emulsion passed through the bed large water droplets settled out on the bead surfaces. Some of the water adhered to the bead surfaces while the remainder drained off into the emulsion where it settled into a water layer at the bottom of the separation vessel.

The water was introduced into each of the various oils by either contacting the oil with steam or by subjecting the oil and added water to a high velocity shear. The resulting water-in-oil emulsion was allowed to settle for 12 hours and a sample decanted from the top of the separation vessel. The water content was measured before and after the experiment using a variant of a Karl Fischer titration technique. The average size of the water droplets was of the order of 2 microns in diameter as determined by optical microscopy. Injected charge densities of $\sim 0.2$ cm$^{-3}$ were employed and flow rates of 12 cm$^3$ s$^{-1}$ were maintained through the charge injector. The power dissipated was 50 mw during the run. The sample size was 1 liter and the flow rates through the packed beads comprising 0.4 cm beads varied with the sample concerned but was no greater than 10 cm$^3$ s$^{-1}$. The bed height was 12 cm and diameter was 8 cm. Passing the emulsion through the apparatus without charge injection resulted in removal of some of the water ($\sim 50\%$). This number varied considerably. However, when the charge injector was switched on, the results set out below were obtained. The results listed in the table are the best results of a series of experiments and show the effectiveness of the separation technique.

TABLE

Best Results of Charged Fluid Coalescence Tests for Several Viscous Oils with Added Dispersed Water.

| Feed | Viscosity @ 20° C. (cp) | Excess H$_2$O (ppm) In | Excess H$_2$O (ppm) Out |
|---|---|---|---|
| Marcol 52 (white oil) | 11 | 820 | 8 |
| SI50N (lube base oil) | 55 | 531 | 8 |
| Marcol 52/Primol 355 (white oil mixture) | 95 | 355 | 5 |
| Primol 355 (white oil) | 155 | 630 | 32 |
| S600N (lube base oil) | 255 | 800 | 8 |
| S600N (lube base oil) | 255 | 7000 | 400 |
| Bright Stock (lube base oil) | 2100 | 550 | 70 |

EXAMPLE 2

By way of a second example, it has been demonstrated that wax crystals, which may be present as a dispersed contaminant phase in a lubricating oil, may be made to agglomerate in the bulk of the liquid by the injection of free excess charge.

Marcol 52, a highly refined white oil manufactured by Exxon Chemical Company, was mixed with a waxy raffinate from a commercial lubricating oil dewaxing plant which contained 15% wax. The wax content of the final mixture was 0.25%. The mixture was stirred at an elevated temperature of about 60° C. Upon cooling wax crystals were precipitated from the mixture to form a dispersion of wax in the white oil.

The wax-containing white oil was passed through a charge injector and into a vesel such as shown in FIG. 1, except that the separation vessel contained no glass beads. The wax crystal size distribution upon sampling with an optical image analyzer and where the charge injector was inoperative is shown as the continuous curve in FIG. 4. The size distribution had a mean value of 14$\mu$ diameter and 70% of the crystals were smaller than 20$\mu$.

Figure 4:
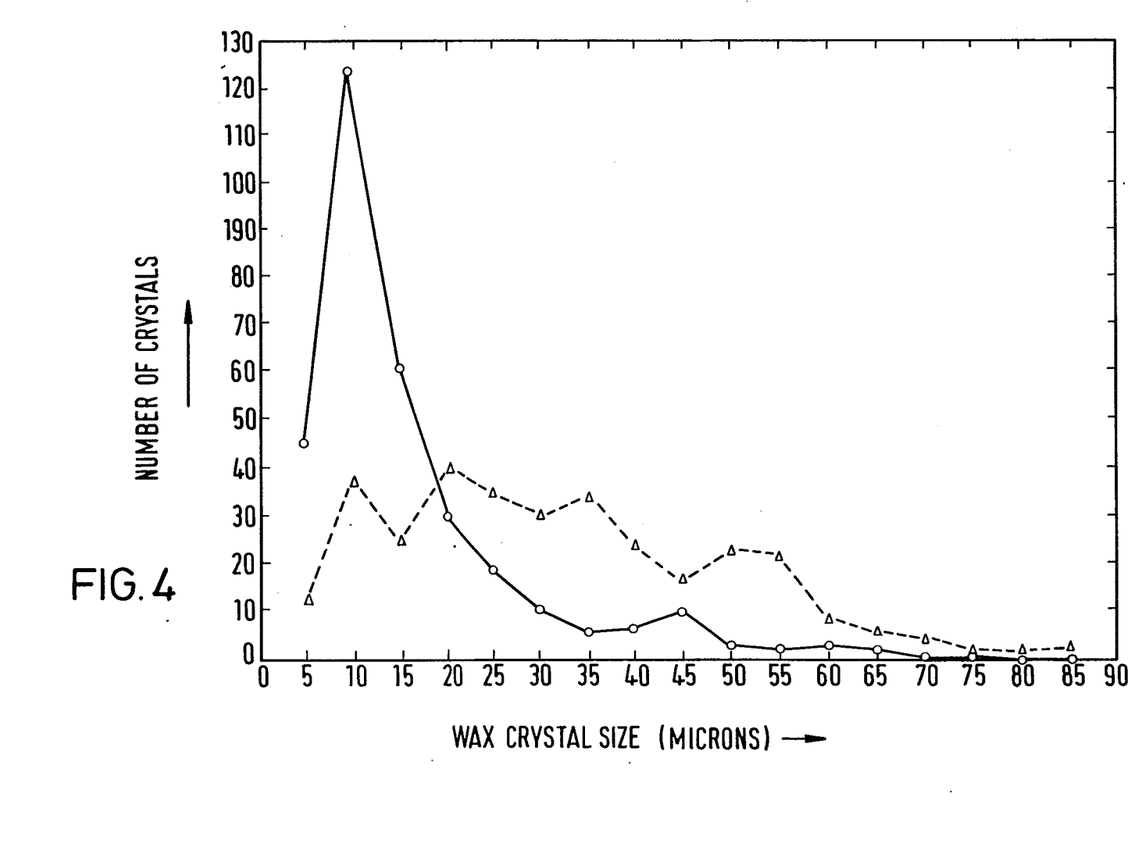
FIG. 4 is a graph demonstrating the wax particle agglomeration which occurs in the case of a white mineral oil contaminated with wax crystals, when treated using similar apparatus to that of FIG. 1 except that no beads were present.

Subsequent to passing the two-phase mixture through the apparatus with charge injection occurring, the measured size distribution is shown on the dashed, broken line in FIG. 4. it can be seen that a significant amount of agglomeration occurred increasing the mean wax crystal size to 30$\mu$ with the wax particles below 20$\mu$ decreasing their fraction to 23%.

It should be understood that the foregoing disclosure and description are only illustrative and explanatory of the invention. Various changes in and modifications to the components of the inventive apparatus and methods, as well as in the details of the illustrated apparatus and of the disclosed processes, may be made within the scope of the appended claims without departing from the spirit of the invention.

Finally reference is hereby directed to co-pending U.S. Patent Application Ser. No. 722,167 and 722,163, both filed on the same day as the present application and assigned to the present assignees, for respective disclosures of similar subject matter to the present invention.

We claim:

1. A method of inducing growth in size of wax particles and/or water droplets forming a dispersion in a hydrocarbon oil mixture boiling in the lubricating oil range, wherein free excess electric charge which is net unipolar is introduced into a body of the wax/water-containing oil mixture which is devoid of any collector surface areas disposed inside said body of oil mixture, and wherein the introduced charge is allowed to induce said growth in size of wax particles and/or water droplets within said body of oil mixture.

2. A method according to claim 1, in which the electric charge is introduced into said wax/water containing oil mixture by charge injection.

3. A method of enhancing separation of wax particles and/or water droplets from a hydrocarbon oil mixture boiling in the lubricating oil range, in which oil mixture the wax/water forms a dispersion, in which the wax particles and/or water droplets are grown in size, before being separated from the oil mixture, by introducing free excess electric charge which is net unipolar onto a body of the wax/water-containing oil mixture which is devoid of any collector surfaces disposed inside said body of oil mixture, and by allowing the introduced charge to induce said growth in size of wax particles and/or water droplets within said body of oil mixture.

4. A method according to claim 3, wherein the electric charge is introduced into said wax/water containing oil mixture by charge injection.

5. A method of separating wax particles and/or water droplets from a hydrocarbon oil mixture boiling in the lubricating oil range, in which oil mixture the wax/water forms a dispersion, in which the wax/water-containing oil mixture is introduced into a separation vessel to provide a body of oil mixture inside said separation vessel, said body of oil mixture being devoid of any collector surface areas disposed inside said body of oil mixture, free excess electric charge which is net unipolar is introduced into said body of oil mixture in the separation vessel, the introduced charge is allowed to cause growth in size of the wax particles/water droplets within said body of oil mixture, and grown wax particles/water droplets are separated from the oil mixture.

6. A method according to claim 5, wherein the electric charge is introduced into the wax/water containing oil mixture by charge injection.

7. A method according to claim 6 of separating wax particles from a hydrocarbon oil mixture containing at last wax particles, wherein grown wax particles are separated by mechanical filtering.

8. A method according to claim 6 of separating wax particles from a hydrocarbon oil mixture containing at least wax particles, wherein at least one collector surface is positioned inside the separation vessel in one region so that growing wax particles from another region in the separation vessel will collect and deposit on said collector surface.

9. A method according to claim 6 of separating wax particles from a hydrocarbon oil mixture containing at least wax particles, wherein a bed of packed collector beads is positioned inside the separation vessel containing said body of oil mixture in one region so that grown wax particles from another region in the separation vessel containing said body of oil mixtures will collect and deposit on said collector beads.

10. A method according to claim 6 of separating water from a hydrocarbon oil mixture containing at least water droplets and whose density is different from that of water, wherein the water droplets are left to grow and accumulate until they form into a layer of water distinct from the hydrocarbon oil mixture in the separation vessel.

11. A method according to claim 6 of separating water from a hydrocarbon oil mixture containing at least water droplets and whose density is different from that of water, wherein at least one collector surface is positioned inside the separation vessel in one region so that growing water droplets from another region in the separation vessel containing said body of oil mixture will collect on said collector surface and grow further before becoming detached from said collector surface and separating from the oil mixture in the separation vessel to form a layer of water distinct from the hydrocarbon oil mixture in the separation vessel.

12. A method according to claim 6 of separating water from a hydrocarbon oil mixture containing at least water droplets and whose density is different from that of water, wherein a bed of packed collector beads is positioned inside the separation vessel in one region so that growing water droplets from another region of said separation vessel containing said body of oil mixture will collect on said beads and grow further before becoming detached from said beads and separating from the oil in the separation vessel to form a layer of water distinct from the hydrocarbon oil mixture in the separation vessel.

13. A method as claimed in claim 5, wherein the free charge is introduced by field emission into a stream of said oil mixture and the charged stream is directed as a stream or spray through a gas or vapor space before entering the separation vessel, said gas or vapor space serving to reduce or minimise charge dissipation from said body of oil mixture in said separation vessel back to where the free charge introduction took place.

14. A method as claimed in claim 5, wherein the free charge is introduced into the oil mixture at least predominantly by electron emission.

15. A method as claimed in claim 5, wherein the free charge is introduced into the oil mixture without producing ionic dissociation within the oil mixture.

16. A method for batch separation of wax particles from a hydrocarbon oil mixture boiling in the lubricating oil range, wherein:

a quantity of wax-containing oil mixture is introduced into a separation vessel, the oil mixture is then recirculated from the separation vessel around a closed circuit and back to the separation vessel again, so as, successively, to have electric charge which is net unipolar injected into it by field emission, pass through a wax-growth region in the separation vessel, which region is free of any collector surface areas disposed within the oil mixture in that region, and be mechanically filtered in another region in the separation vessel whereby wax particle agglomeration and growth occurs within the oil mixture in the wax-growth region due to the injected charge, and grown wax particles are separated from the oil mixture by the mechanical filtering, and when sufficient wax has been separated from the oil mixture, the clarified oil mixture is discharged from the separation vessel.

17. A method for batch separation of wax particles from a hydrocarbon oil mixture boiling in the lubricating oil range, wherein:

a quantity of wax-containing lubricating oil is introduced into a separation vessel the oil mixture is then recirculated from the separation vessel around a closed circuit and back to the separation vessel again, so as, successively, to have electric charge which is net unipolar injected into it by field emission, pass through a wax-growth region in the separation vessel, which region is free of any collector surface areas disposed within the oil mixture in that region, and pass through a bed of packed wax collector beads in another region in the separation vessel, whereby wax particle agglomeration and growth occurs in the wax-growth region due to the injected charge and grown wax particles collect and deposit on said beads, and when sufficient wax has been separated from the oil mixture by the beads, the clarified oil mixture is discharged from the separation vessel.

18. A method for batch separation of wax particles from a hydrocarbon oil mixture boiling in the lubricating oil range, wherein:

a quantity of wax-containing oil mixture is introduced into a separation vessel defining an internal space which is free of any interior collector surface areas disposed within the oil mixture in said internal space, the oil mixture is then recirculated from the separator vessel around a closed circuit and back to the separation vessel again so as, successively, to have free excess electric charge which is net unipolar injected into it by field emission, pass through the separation vessel and pass through a filter device in said closed circuit, whereby wax particle agglomeration and growth occurs within the oil mixture in the separation vessel due to the injected charge, and grown wax particles are separated from the oil mixture by the filter device, and when sufficient wax has been separated from the oil mixture by the filter device, the clarified oil mixture is discharged from the separation vessel.

19. A method for continuous separation of wax particles from a hydrocarbon oil mixture boiling in the lubricating oil range, wherein free excess electric charge which is net unipolar is injected by field emission into a flow of wax-containing hydrocarbon oil mixture, the charged oil mixture is introduced into a separation vessel, the separation vessel interior having a region which is free of any internal collector surface areas disposed within the oil mixture in said region and the charged oil mixture being maintained in said region with a sufficient residence time that wax particle agglomeration and growth occurs within the oil mixture in said region in the separation vessel, and wax-laden oil mixture from the said region in the separation vessel is then subjected to filtration to remove the grown wax particles.

20. A method according to claim 19, wherein grown wax particles are removed by mechanical filtering of the oil mixture.

21. A method according to claim 19, wherein grown wax particles are removed by passing the oil through a bed of packed collector beads in another region in the separation vessel.

22. A method for batch separation of dispersed water droplets from a hydrocarbon oil mixture boiling in the lubricating oil range, the density of the oil mixture being different from that of the water, wherein:

a quantity of water-containing hydrocarbon oil mixture is introduced into a separation vessel, the oil mixture is then recirculated from the separation vessel around a closed circuit and back to the separation vessel again, so as, successively, to have electric charge which is net unipolar injected into it by field emission, pass through a water droplet growth region in the separation vessel, which region is free of any interior collector surface areas disposed within the oil mixture in said region, and pass through a bed of packed collector beads in another region in the separation vessel, whereby water droplet agglomeration and growth occurs in the water droplet growth region due to the injected charge, and grown water droplets collect on said beads and grow further before becoming detached from said beads and settling from the oil mixture to form into a layer of water distinct from the oil mixture in the separation vessel, and when sufficient water has been separated from the oil mixture, the clarified oil mixture is discharged from the separation vessel.

23. A method for continuous separation of water droplets from a hydrocarbon oil mixture boiling in the lubricating oil range, the density of the hydrocarbon oil mixture being different from that of the water, wherein free excess electric charge which is net unipolar is injected by field emission into a flow of water-containing hydrocarbon oil mixture, the charged oil mixture is introduced into a separation vessel, the separation vessel interior having a region which is free of any internal collector surface areas disposed within the oil mixture in that region and the charged oil mixture being maintained in said region with a sufficient residence time that water droplet agglomeration and growth occurs within the oil mixture in said region in the separation vessel, grown water droplets are collected in a bed of packed collector beads in another region in the separation vessel and continue to grow on the beads until they become detached from the beads and settle from the oil mixture to form into a layer of water distinct from the oil mixture in the separation vessel, and oil from a relatively water-free oil region in the separation vessel is discharged from the separation vessel.

24. Apparatus for separating wax particles and/or water droplets from a hydrocarbon oil mixture boiling in the lubricating oil range, comprising a separation vessel whose interior is free of any interior collector surface areas disposed within the interior of said separation vessel, means for introducing wax/water-containing oil mixture into the vessel and for discharging the oil mixture from the vessel, means for introducing free excess electric charge which is net unipolar into the oil mixture so that the oil mixture in the separation vessel is charged, means for maintaining the charged oil mixture in the separation vessel with sufficient residence time that wax particle/water droplet agglomeration and growth occurs within the oil mixture in the separation vessel, and a filter device for filtering the oil mixture discharged from the separation vessel for separating the grown wax partcles and/or water droplets from the oil mixture, said filter device comprising a settling chamber in which wax particles and/or water droplets can settle under gravity and a filter screen through which oil mixture from a relatively wax and water-free region of the settling chamber is passed.

25. Apparatus as claimed in claim 24, wherein a grounded grid electrode is positioned inside the separation vessel in electrical contract with the charged oil mixture in the separation vessel.

26. A method of separating wax particles and/or water droplets from a hydrocarbon oil mixture boiling in the lubricating oil range, in which oil mixture the wax/water forms a dispersion, said method comprising:

(1) introducing free charge that is net unipolar into the oil mixture, at least predominantly by electron emission which causes the oil mixture to act as a medium through which volumetric distribution of the introduced charge takes place, (2) passing the charged oil mixture into a wax particle/water droplet agglomeration region containing a body of charged oil mixture which is devoid of any collector surface areas disposed within said body of oil mixture, there being a sufficient excess of free charge introduced such that the volumetric charge distribution causes, in said agglomeration region, an electric field to be induced in said body of charged oil mixture and the wax particles/water droplets to become charged, and the induced electric field and the charge on the wax particles/water droplets interact to produce an electrical driving force acting on the wax particles/water droplets, said electrical driving force producing migration of wax particles/water droplets within said body of oil mixture with resulting wax particle/water droplet agglomeration, and (3) collecting said such agglomerated wax particles and/or water droplets so as to leave substantially wax-free oil mixture.

* * * * *